United States Patent
Stapperfenne et al.

(10) Patent No.: US 10,428,193 B2
(45) Date of Patent: Oct. 1, 2019

(54) POLYURETHANE PREPREGS WITH CONTROLLABLE TACK

(71) Applicant: Evonik Degussa GmbH, Essen (DE)

(72) Inventors: Uwe Stapperfenne, Wülfrath (DE); Marina-Elena Schmidt, Gelsenkirchen (DE); Tobias Gutmann, Dorsten (DE); Christina Cron, Velbert (DE); Sandra Reemers, Münster (DE)

(73) Assignee: Evonik Degussa GmbH, Essen (DE)

( * ) Notice: Subject to any disclaimer, the term of this patent is extended or adjusted under 35 U.S.C. 154(b) by 126 days.

(21) Appl. No.: 15/336,922

(22) Filed: Oct. 28, 2016

(65) Prior Publication Data

US 2017/0121476 A1   May 4, 2017

(30) Foreign Application Priority Data

Oct. 30, 2015   (EP) .................................. 15192266

(51) Int. Cl.
| | | |
|---|---|---|
| *C08J 5/24* | (2006.01) | |
| *B29C 35/02* | (2006.01) | |
| *C08G 18/79* | (2006.01) | |
| *C08G 59/42* | (2006.01) | |
| *C08G 18/42* | (2006.01) | |
| *C08L 75/04* | (2006.01) | |
| *C08J 5/04* | (2006.01) | |
| *C08J 5/12* | (2006.01) | |
| *B29C 35/04* | (2006.01) | |
| *B29C 35/08* | (2006.01) | |

(52) U.S. Cl.
CPC ................ *C08J 5/24* (2013.01); *B29C 35/02* (2013.01); *C08G 18/42* (2013.01); *C08G 18/798* (2013.01); *C08G 59/42* (2013.01); *C08J 5/042* (2013.01); *C08J 5/121* (2013.01); *C08L 75/04* (2013.01); *B29C 35/045* (2013.01); *B29C 2035/0822* (2013.01); *C08J 2375/06* (2013.01); *C08J 2463/00* (2013.01)

(58) Field of Classification Search
CPC . B32B 38/08; B32B 2260/02; B32B 2260/04; B32B 2260/046; C08J 5/24; C08J 5/121; C08G 18/42; C08G 18/798

See application file for complete search history.

(56) References Cited

U.S. PATENT DOCUMENTS

| | | | |
|---|---|---|---|
| 5,391,681 A | 2/1995 | Mühlebach et al. | |
| 8,455,090 B2 | 6/2013 | Schmidt et al. | |
| 9,902,095 B2 * | 2/2018 | Stapperfenne | ........ B29C 43/021 |
| 9,902,096 B2 * | 2/2018 | Stapperfenne | ......... C09J 175/06 |
| 2013/0230716 A1 | 9/2013 | Schmidt et al. | |
| 2013/0231017 A1 | 9/2013 | Schmidt et al. | |
| 2013/0231022 A1 | 9/2013 | Schmidt et al. | |
| 2013/0303042 A1 | 11/2013 | Schmidt et al. | |
| 2013/0323993 A1 | 12/2013 | Schmitt et al. | |
| 2014/0087613 A1 | 3/2014 | Spyrou et al. | |
| 2014/0217332 A1 * | 8/2014 | Simmons | ................ B32B 5/022 |
| | | | 252/511 |
| 2015/0218375 A1 | 8/2015 | Hupka et al. | |
| 2015/0321392 A1 | 11/2015 | Stapperfenne et al. | |
| 2015/0321393 A1 | 11/2015 | Stapperfenne et al. | |
| 2016/0023384 A1 | 1/2016 | Spyrou et al. | |
| 2017/0066179 A1 * | 3/2017 | Diehl | ..................... B29C 70/86 |

FOREIGN PATENT DOCUMENTS

| | | |
|---|---|---|
| EP | 2946922 | 11/2015 |
| EP | 2946923 | 11/2015 |

OTHER PUBLICATIONS

Wicks, Jr., et al. Organic Coatings: Science and Technology, Wiley-Interscience, New York 1999, chap. 24.21 2, p. 459.
Habenicht, "Kleben-Grundlagen, Technologie, Anwendungen", Adhesive Bonding-Fundamentals, Technology, Applications, Springer Verlag Berlin, 2009, p. 199.
Granbom, Doctoral thesis 2010, Royal Institute of Technology School of Industrial Engineering and Management SE-100 44 Stockholm, Sweden.
Extended European Search Report for Application No. 16192833.8 dated Mar. 2, 2017 (7 pages).

\* cited by examiner

*Primary Examiner* — John L Goff, II
(74) *Attorney, Agent, or Firm* — Michael Best & Friedrich LLP

(57) ABSTRACT

The invention relates to a process for producing a prepreg based on polyurethane, which is notable for high storage stability at room temperature, a two-stage reaction mechanism, and adjustable adhesion on metal surfaces. It is based on the problem of making the surface tack of the prepregs controllable during processing. The solution is to assemble the PU mixture from which the matrix originates at a later stage such that the glass transition temperature of the thermoplastic polymer is above 30° C. For this purpose, the invention proposes two basically independent but certainly synergistic measures, namely:
  i) use of a polyol compound or a mixture of a number of polyol compounds as binder, the OH number or mean OH number of which is above 300 mg KOH/g,
  ii) choice of the proportion of hardener corresponding to the co-binder in the reactive composition at greater than 2% by weight, based on the total solids content of the reactive composition.

16 Claims, No Drawings

POLYURETHANE PREPREGS WITH CONTROLLABLE TACK

CROSS-REFERENCE TO RELATED APPLICATIONS

This patent application claims the benefit of priority to European Patent Application No. 15192266.3, filed on Oct. 30, 2015, the disclosure of which is incorporated by reference herein in its entirety.

FIELD OF THE INVENTION

The invention relates to a process for producing a prepreg based on polyurethane, which is notable for high storage stability at room temperature, a two-stage reaction mechanism, and adjustable adhesion on metal surfaces. In addition, the invention relates to corresponding prepregs, to the use thereof in the production of hybrid components and to correspondingly produced hybrid components.

BACKGROUND

A "prepreg" is a semi-finished product which is used for the production of fibre composite components or hybrid components. It consists essentially of a textile fibre material impregnated with a precursor of a matrix material. The precursor of the matrix material is formable and tacky, such that it is possible to create a precursor of the later fibre composite component or hybrid component from one or more prepregs. On conclusion of the shaping, the precursor of the matrix material is converted to the final thermoset matrix material by performing a chemical reaction. In this way, the fibre composite component or hybrid component attains its ultimate stiffness.

A fibre composite component refers in this context to a component which is a component of a machine, of a land, air, space or water vehicle, of an apparatus, of an installation or of an appliance and which is formed from different, inextricably interconnected materials, where at least one material takes the form of fibres and at least one material surrounds the fibres as matrix. For that reason, the fibre composite material is a heterogeneous material.

SUMMARY OF THE INVENTION

A hybrid component in the sense used here is a particular fibre composite component consisting firstly of a conventional homogeneous material, for example steel or aluminium, and secondly of a heterogeneous fibre composite material. The fibre composite material has high adhesion to the homogeneous material, such that a stable bond is formed. A hybrid component thus comprises at least three materials, namely the homogeneous material (usually a metal material), the matrix material (usually organic polymer) and the fibre material (typically organic or inorganic fibres).

DETAILED DESCRIPTION

The invention described here is concerned specifically with the composition of the matrix material. More specifically, the latter is a latently curing polyurethane formulation.

Polyurethane is understood to mean a class of polymers which are obtained through reaction of polyisocyanates with polyols. Polyurethane is frequently abbreviated to PU or PUR.

In the last few years, there has been development of polyurethane-based prepregs which feature storage stability at room temperature. Storage stability is understood to mean the particular property of these prepregs to be storable over several months at room temperature without the precursor of the matrix material losing its reactivity. Unlike prepregs based on epoxy resin, storage-stable PU prepregs need not be cooled in a costly manner prior to processing; this matrix material remains in its precursor state for months at room temperature and does not cure prematurely to the final form. It is thus much easier to handle storage-stable PU prepregs than the epoxy resin-based prepregs that have been in predominant use to date. Storage-stable PU prepregs thus help to significantly reduce the production costs for fibre composite components.

Since good adhesion between the homogeneous metal material and the heterogeneous fibre composite material is important in the production of hybrid components and the first generation storage-stable PU prepregs do not have sufficient metal adhesion for this purpose, it has barely been possible to date to use these prepregs in the production of hybrid structures.

First-generation storage-stable PU prepregs are disclosed in U.S. Pat. No. 8,455,090. The polyurethane matrix used therein is at first in a solid, non-tacky form. Only from a temperature above 100° C. does the mixture react to give a crosslinked polyurethane and forms the matrix of the fibre composite material. The advantage of these prepregs is thus that they can be plastically formed in the course of processing during the production of the fibre composite component according to the invention. Prior to curing, the material has all the positive processing properties of a thermoplastic. The prepregs are additionally storage-stable in their thermoplastic state over several months and hence for a sufficiently long period, such that the production of the prepregs can be effected in a first facility and the shaping of the prepregs to give the shaped body and the final crosslinking thereof at another, remote site. The handling without special storage conditions is an advantage over conventional epoxide matrices which have to be stored at low temperatures of about −18° C. and thawed in an inconvenient manner before they can be processed.

After the thermal curing of the polyurethane material to give the thermoset, good ultimate mechanical properties, especially high strengths and stiffnesses, and low creep characteristics and good chemical resistance are achieved.

The agents responsible for the temperature-dependent curing mechanism are latent hardeners having blocked isocyanate groups, more specifically uretdiones internally blocked by dimerization.

The prepregs described in U.S. Pat. No. 8,455,090 are non-tacky at room temperature and even at temperatures up to 60° C. Adhesion to metal surfaces is low without further pre-treatment or use of an adhesion promoter. Consequently, it is possible to produce metal-free fibre composite components with these first-generation prepregs, but it is barely possible to produce hybrid components.

A second generation of storage-stable polyurethane compositions which are also suitable for production of hybrid components based on steel or aluminium due to a particularly high metal adhesion are described in applications EP15164444.0 and U.S. patent application Ser. No. 14/705,485 or EP 15164477.0 and U.S. patent application Ser. No 14/705,563, which are yet to be published at the filing date.

EP15183660.8, which was likewise yet to be published at the filing date, describes a PU-based, storage-stable prepreg which has a two-stage curing mechanism and is intended for local reinforcement of predominantly metallic components. This reinforcement patch has excellent metal adhesion.

Regrettably, these prepregs have good adhesion not only at the intended site of use, but also, because of their surface tack, stick in an unwanted manner to metallic surfaces of operating devices with which they come into contact in the course of production of the hybrid components. Mention should be made here, for example, of metallic tablets on which the prepregs are transported and stored, grabs of handling devices, press moulds and oven doors.

The effect of this is that the operating devices which come into contact with the prepregs that have been optimized in terms of metal adhesion have to be provided with a suitable nonstick coating, for instance composed of PTFE or the like. This is not always possible and complicates the process procedure.

With respect to this prior art, the problem addressed by the present invention is that of specifying storage-stable prepregs having a two-stage curing mechanism and good metal adhesion, and having surface tack which is targetedly controllable during processing. In this way, unwanted sticking to metallic surfaces is to be avoided, but good intentional adhesion to metallic parts of later hybrid components is nevertheless still to be ensured. Ideally, the prepregs to be specified are non-tacky until they have been positioned at their intended site of use and do not have good adhesion until they are at their site of use.

This object is achieved by a process for producing prepregs, having the following steps:
a) providing a reactive composition comprising at least the following constituents:
   at least one blocked hardener which is preferably an internally blocked uretdione having an NCO functionality of at least two,
   at least one binder which is a polyol compound having an OH functionality of 3 to 6 and which has at least one polar functional group selected from an ester, carbonate, amide, urethane, urea, thioester or thiocarbonate functionality;
   at least one co-binder which is an epoxy resin,
   at least one hardener which corresponds to the co-binder and is selected from the group comprising the following substance classes: aliphatic polyamines, cycloaliphatic polyamines, polyetheramines, polymercaptans or polyamidoamines, polycarboxylic acids, polycarboxylic anhydrides;
b) providing fibres;
c) coating the fibres with the reactive composition;
d) exposing at least the reactive composition to heat to perform a first crosslinking reaction, in the course of which hardener and binder are converted to a thermoplastic polymer, the fibres being embedded into the thermoplastic polymer;
e) obtaining a prepreg comprising the thermoplastic polymer with the fibres embedded therein,
wherein the reactive composition is provided in such a way that the glass transition temperature of the thermoplastic polymer measured in the second heating curve at 10 K/min according to the DSC method as defined in DIN 53765 is above 30° C., through
i) use of a polyol compound or a mixture of a number of polyol compounds as binder, the OH number measured according to DIN 53 240-2 or mean OH number of which is above 300 mg KOH/g,
and/or ii) choice of the proportion of corresponding hardener in the reactive composition at greater than 2% by weight, based on the total solids content of the reactive composition.

A basic concept of the invention is to compose the reactive composition, i.e. the PU mixture from which the matrix arises at a later stage, such that the glass transition temperature of the thermoplastic polymer (the precursor of the later matrix material after performance of the first crosslinking reaction) is above 30° C. This means that the thermoplastic material and hence the prepreg only becomes tacky above 30° C. and has only low surface tack at lower temperatures. In order to allow the mixture to stick at the intended site, heating of the matrix material to temperatures above its glass transition temperature is required. This can be effected, for example, with a heated pressing tool or by local heating of the metal part to which the prepreg is being stuck.

In addition, the prepreg can be heated outside the joining or pressing tool immediately prior to joining to the (cold) metal.

Provided that the prepreg is stored, transported or handled below the glass transition temperature of the matrix material, it has low surface tack and thus does not stick somewhere or other in an unwanted manner. The glass transition temperature is set to a value above 30° C., since temperatures below 30° C. prevail under normal environmental conditions in storage, transport and production.

For adjustment of the glass transition temperature of the thermoplastic prepreg, the invention proposes two basically independent but certainly synergistic measures, namely:
i) use of a polyol compound or a mixture of polyol compounds as binder, the OH number or mean OH number of which is above 300 mg KOH/g,
ii) choice of the proportion of hardener corresponding to the co-binder in the reactive composition at greater than 2% by weight, based on the total solids content of the reactive composition.

Glass transition temperature above 30° C. can thus be established by using, as binder, a polyol compound having a correspondingly large OH number above 300 mg KOH/g and/or by choosing the proportion of corresponding hardener in the reactive composition at greater than 2% by weight.

The invention is thus based on the finding that the glass transition temperature and hence the tack of the thermoplastic polymer can be increased by using polyols having a high OH number as binder and/or by using a large amount of corresponding hardener.

The increased OH number of the binder increases the number of reactive groups prior to the reaction and consequently also the number of converted groups after the first reaction step. In this way, the buildup of molecular weight in the first reaction step—i.e. in the production of the prepreg—is enhanced. Since the glass transition temperature correlates directly with the chain length (i.e. the mean molecular weight) of the thermoplastic, the result is an increase in the glass transition temperature. Analogously, an elevated proportion of corresponding hardener (which is typically added in deficiency) leads to an increased number of groups reacted with the co-binder in the first reaction step. This also brings about an increase in the chain lengths (molecular weight) and hence an increase in the glass transition temperature.

This finding is utilized in the processing of the prepregs, where the tack is only "switched on" at the desired juncture by heating above the glass transition temperature.

The control of tack which is the aim of the invention is therefore effected firstly through the formulation of the reactive composition and secondly through the temperature regime in the course of production of the hybrid component. There is thus a direct relationship between the production of the prepreg and the production of the hybrid component.

The first obligatory constituent of the reactor composition is a blocked hardener having an NCO functionality of at least two.

A number of at least two blocked isocyanate groups per molecule (called the NCO functionality) is necessary for the generation of a close-mesh polymeric network having high mechanical strengths after the reaction with the polyols used. Preference is given to using an internally blocked (i.e. blocking agent-free) uretdione as hardener.

Such blocking agent-free uretdiones may be prepared from at least one of the following substances: isophorone diisocyanate (IPDI), hexamethylene diisocyanate (HDI), diisocyanatodicyclohexylmethane (H12MDI), 2-methylpentane diisocyanate (MPDI), mixtures of 2,2,4-trimethylhexamethylene diisocyanate and 2,4,4-trimethylhexamethylene diisocyanate (TMDI), and norbornane diisocyanate (NBDI).

Particular preference is given to using IPDI, HDI, TMDI and/or H12MDI. Very particular preference is given to using the uretdione of IPDI and/or HDI. It is also possible to use mixtures of as-specified uretdiones as hardener.

The uretdiones used with preference are blocking agent-free per se. The internal blocking via dimerization to give the uretdione structure is reversible; at elevated temperature the uretdione dissociates back to the two isocyanate groups originally present, which can crosslink with the binder. The advantage over external blocking agents is that the dissociation does not form any volatile by-products. These can lead to formation of gas bubbles between fibre composite material and metal surface or between the individual prepreg laminas and hence to delamination.

The second obligatory component of the reactive composition is the binder. The binder is a polyol compound which has three to six hydroxyl groups and which has at least one polar functional group selected from an ester, carbonate, amide, urethane, urea, thioester or thiocarbonate functionality. The presence of the polar functional group is necessary in order to assure high metal adhesion.

The number of hydroxyl groups (functionality) is crucial in determining the crosslinking density and hence the mechanical properties of the cured matrix. In order to obtain a three-dimensionally tightly crosslinked thermoset polymer network, a functionality of the polyol component of at least three is required. By contrast, the effect of a functionality greater than six is that the polyurethane in the thermoset final state attains an excessive crosslinking density and the matrix becomes brittle. As a result, the OH functionality of the polyol used as binder must be between three and six. It will be appreciated that it is also possible to use mixtures of different polyols, which will be the case in practice. When two or more polyols are used, the functionality figures relate to averaged values for the polyol mixture.

Aside from this, at least one of the polyols used as binder must have not only hydroxyl groups but also additional polar functional groups which enter into interactions with metal surfaces. These include, for example, ester, carbonate, amide, urethane, urea, thioester or thiocarbonate groups. Examples of suitable polyols are linear or branched hydroxyl-containing polyesters, polycarbonates, polycaprolactones, polyesteramides, polyurethanes or polyacetals. By comparison, polyethers or polythioethers have markedly lower metal adhesion and are therefore not suitable as the main constituent of the polyol mixture.

In a particularly preferred variant of the invention, a polyester polyol is used as binder.

Polyester polyols are linear or lightly branched polyesters containing hydroxyl groups. These are known for good metal adhesion from their use in coil coating; cf. Organic Coatings: Science and Technology, Z. W. Wicks, Jr., F. Jones, S. P. Pappas, Wiley-Interscience, New York 1999, chap. 24.2.1.2, page 459.

The OH number of the polyester polyol should be between 20 mg KOH/g and 500 mg KOH/g and the acid number thereof should be not more than 2 mg KOH/g. If the proportion of the corresponding hardener is not above 2% by weight, the OH number of all polyols in the mixture must be above 300 mg KOH/g. The OH number is determined as per DIN 53 240-2, and the acid number as per DIN EN ISO 2114. The molar mass is calculated from the sum of the hydroxyl and carboxyl end groups. The mean molecular weight is 50 g/mol to 10 000 g/mol, preferably 100 g/mol to 5000 g/mol.

Polyester polyols are prepared, for example, via a polycondensation reaction, i.e. by reaction of polyols with substoichiometric amounts of polycarboxylic acids or derivatives thereof, for example polycarboxylic anhydrides, polycarboxylic esters of lower alcohols, lactones or hydroxycarboxylic acids.

Examples of diols suitable for preparation of polyester polyols include ethylene glycol, 1,2-propanediol, 1,3-propanediol, diethylene glycol, dipropylene glycol, triethylene glycol, tetraethylene glycol, 1,2-butanediol, 1,4-butanediol, 1,3-butylethylpropanediol, 1,3-methylpropanediol, 1,5-pentanediol, bis(1,4-hydroxymethyl)cyclohexane (cyclohexanedimethanol), glycerol, hexanediol, neopentylglycol, trimethylolethane, trimethylolpropane, pentaerythritol, bisphenol A, bisphenol B, bisphenol C, bisphenol F, norbornylene glycol, 1,4-benzyldimethanol, 1,4-benzyldiethanol, 2,4-dimethyl-2-ethyl-1,3 hexanediol, 1,4-butylene glycol, 2,3-butylene glycol, di-β-hydroxyethylbutanediol, 1,5-pentanediol, 1,6-hexanediol, 1,8-octanediol, decanediol, dodecanediol, neopentylglycol, cyclohexanediol, 3(4),8(9)-bis(hydroxymethyl)tricyclo[5.2.1.0$^{2,6}$]decane (dicidol), 2,2-bis(4-hydroxycyclohexyl)propane, 2,2-bis[4-(β-hydroxyethoxy)phenyl]propane, 2-methyl-1,3propanediol, 2-methylpentane-1,5-diol, 2,2,4(2,4,4)-trimethyl-1,6-hexanediol, 1,2,6-hexanetriol, 1,2,4-butanetriol, tris(β-hydroxyethyl) isocyanurate, mannitol, sorbitol, polypropylene glycols, polybutylene glycols, xylylene glycol or neopentylglycol hydroxypivalate, 2-methylpropanediol, 2,2-dimethylpropanediol, diethylene glycol, 1,12-dodecanediol, 1,4-cyclohexanedimethanol, 1,2-cyclohexanediol and 1,4-cyclohexanediol.

Dicarboxylic acids or derivatives suitable for preparation of the polyester polyols may be aliphatic, cycloaliphatic, aromatic and/or heteroaromatic in nature and may optionally be substituted, for example by halogen atoms, and/or unsaturated.

Preferred dicarboxylic acids or derivatives include propionic acid, succinic acid, glutaric acid, adipic acid, suberic acid, azelaic and sebacic acid, azelaic and dodecanedioic acid, 2,2,4(2,4,4)-trimethyladipic acid, phthalic acid, phthalic anhydride, isophthalic acid, terephthalic acid, dimethyl terephthalate, tetrahydrophthalic acid, maleic acid, maleic anhydride and dimeric fatty acids.

The diols and dicarboxylic acids/derivatives thereof used for preparation of the polyester polyols can be used in any desired mixtures.

In a preferred variant, the binder used is at least one polycaprolactone having an OH number between 20 mg KOH/g and 1000 mg KOH/g, an acid number of not more than 2 mg KOH/g and a molar mass between 100 g/mol and 5000 g/mol. If the proportion of the corresponding hardener is not above 2% by weight, the OH number must be above 300 mg KOH/g. Since the polycaprolactones are prepared via a controlled ring opening polymerization, the high hydroxyl numbers required can be set in a controlled manner. The OH number is determined as per DIN 53 240-2, and the acid number as per DIN EN ISO 2114. The molar mass is calculated from the sum total of the hydroxyl and carboxyl end groups. Such polycaprolactones are available, for example, from the Capa® product line from Perstorp, Sweden.

The third obligatory component of the reactive composition is the co-binder. This crosslinks together with the corresponding (second) hardener up to a low degree of curing during the first crosslinking reaction and undergoes final crosslinking in the second crosslinking reaction. This results not only in a further improvement in the mechanical properties in the crosslinked state but also in an additional improvement in the metal adhesion via polar interactions.

Useful co-binders include all epoxy resins, for example polyepoxides based on bisphenol A diglycidyl ether, bisphenol F diglycidyl ether or cycloaliphatic types, for example 3,4-epoxycyclohexylepoxyethane or 3,4-epoxycyclohexylmethyl 3,4-epoxycyclohexanecarboxylate. It is also possible in accordance with the invention to use mixtures of different epoxy resins as co-binder. The co-binder leads to an improvement in the metal adhesion of the matrix, combined with additional crosslinking. Since the co-binder is provided in the reactive composition it need not be separately applied like an adhesive before the attachment of the thermoplastic to the metal. In fact, it improves the intrinsically adhesive properties of the matrix.

The epoxy equivalent weight (EEW) of the co-binder, determined as per ASTM D 1652, is preferably between 100 and 1000 g/eq. When epoxy compounds having an EEW above 1000 g/eq are used, the viscosity of the matrix increases very significantly, and so processing is impeded. In addition, there is severe embrittlement of the matrix, and so there is a drop in the mechanical properties.

The fourth obligatory component of the reactive composition is at least one hardener which corresponds to the co-binder and is selected from the group comprising the following substance classes: aliphatic polyamines, cycloaliphatic polyamines, polyetheramines, polymercaptans or polyamidoamines, polycarboxylic acids, polycarboxylic anhydrides.

However, preference is given to polycarboxylic acids and their anhydrides which, at elevated temperatures, undergo a ring-opening reaction with the oxirane component of the co-binder to give carboxylic esters. Particular preference is given to using the oligomeric adducts of benzene-1,2,4-tricarboxylic 1,2-anhydride or pyromellitic anhydride with ethylene glycol and glycerol as the corresponding hardener for the co-binder.

It is possible to control the glass transition temperature via the proportion of the corresponding hardener: The corresponding hardener reacts together with the co-binder to give a second three-dimensional network in addition to the PU network. In this way, it contributes to an increase in the glass transition temperature of the overall matrix in the early thermoplastic state (as a precursor after the first reaction step), and also in the thermoset state (final state after the second reaction step). Over and above a concentration of corresponding hardener of more than two per cent by weight, the degree of reaction with the epoxy resin after the first reaction step is already sufficiently high that, even in the presence of liquid polyols having OH numbers below 300 mg KOH/g, glass transition temperatures above 30° C. are attained. Said proportion by weight of the corresponding hardener is based on the solids content of the reactive composition, i.e. the total weight of the components without any solvent.

When the proportion of corresponding hardener is below 2% by weight, by contrast, the reaction with the epoxy resin in the thermoplastic state is not sufficient to assure a glass transition temperature above 30° C. Therefore, alternatively, the OH number of the polyol used as binder must be above 300 mg KOH/g in order to achieve the desired glass transition temperature above 30° C.

Glass transition temperatures given here are always related to the glass transition temperature measured in the second heating curve at 10 K/min according to the DSC method as defined in DIN 53765.

The reactive composition may additionally comprise further components, for instance processing aids or added substances such as rheology modifiers, release agents, fillers, deaerators, defoamers, flow assistants, wetting agents, flame retardants, colour pigments and/or levelling auxiliaries. For such components, the collective term "additives" is used hereinafter.

In addition, the reactivity of the composition may if required be accelerated by addition of a catalyst. However, when adding a catalyst care should be taken to ensure that the requirements concerning storage stability of the thermoplastic polyurethane matrix continue to be met. In a particular embodiment of the invention, the reactive composition is actually deliberately free of substances that are catalytically active in the first and/or second crosslinking reaction, in order not to bring about unwanted crosslinking and thus diminish the storage stability.

Catalytically active substances in this connection are quaternary ammonium salts, preferably tetraalkylammonium salts and/or quaternary phosphonium salts having halogens, hydroxides, alkoxides or organic or inorganic acid anions as the counterion. Examples thereof include tetramethylammonium formate, acetate, propionate, butyrate or benzoate, and the corresponding tetraethyl-, tetrapropyl- and tetrabutylammonium or -phosphonium salts.

The reactive composition may be provided in dry or liquid form as desired.

In dry form the reactive composition is a powder. Said powder is scattered and/or melted onto the fibres, in order that it does not fall off the fibres prior to the incipient crosslinking.

Alternatively the constituents of the composition are dissolved in a liquid solvent or at least suspended or dispersed therein if not all constituents are soluble. The composition is thus virtually liquid and the fibres are impregnated with the liquid composition. The composition provided in liquid form in the solvent is technologically easier to handle than dry, pulverulent compositions. A disadvantage in the case of use of solvents can be volatile constituents that remain in the event of inadequate drying, which remain in the polymer after the first crosslinking reaction and can lead to bubble formation. However, removal of the solvent takes place in the course of performance of the first crosslinking reaction via evaporation under the action of heat, which is necessary in any case, and for that reason no additional work step is required.

In a preferred embodiment of the invention, therefore, the composition is provided in a liquid solvent, the constituents of the composition being dissolved and/or suspended and/or dispersed in the solvent, such that the fibres are coated with the composition by impregnating the fibres with the solvent and the constituents dissolved/suspended/dispersed therein, and the solvent is for the most part, but at least partly evaporated out of the fibres in the course of performance of the first crosslinking reaction.

Therefore, the solvent has to not only very substantially dissolve the components of the reactive composition, but also has to be very substantially volatilized in the exposure of the composition to heat which is undertaken to perform the first crosslinking reaction.

Solvents suitable for this purpose are polar, aprotic substances having high boiling points, such as esters and/or ketones. Particular preference is given to using the substances isopropyl acetate and methyl isobutyl ketone as solvent. It is also possible to use mixtures of two or more substances as solvent. For reasons of cost and environmental reasons, the amount of solvent should be reduced to a minimum required. Specifically, the solids content of the solution should be between 30% by weight and 80% by weight, based on the total weight of the solution.

The term "solids content" relates in this connection to the sum total of nonvolatile components that cannot be evaporated under the relevant drying conditions. The solids content is reported in per cent by weight.

Irrespective of whether the reactive composition is provided as a dry powder or in solution, the above-described nonvolatile components of the reactive compositions should be formulated as follows:

between 30% by weight and 70% by weight of hardener
between 30% by weight and 70% by weight of binder
more than 0% by weight and up to 20% by weight of co-binder
more than 0% by weight and up to 20% by weight of corresponding hardener
between 0% by weight and 5% by weight of additives It will be appreciated that the nonvolatile constituents present add up to 100% by weight. Any solvent is therefore not included in the total weight.

Most preferably, the reactive composition has the following composition:

as hardener 40% by weight to 60% by weight of a uretdione or a mixture of two or more uretdiones based on isophorone diisocyanate (IPDI);
as binder 25% by weight to 50% by weight of a polycaprolactone or a mixture of two or more polycaprolactones;
as co-binder 5% by weight to 15% by weight of an epoxy resin selected from the group comprising epoxy resins based on bisphenol A diglycidyl ether, epoxy resins based on bisphenol F diglycidyl ether and cycloaliphatic types, for example 3,4-epoxycyclohexylepoxyethane or 3,4-epoxycyclohexylmethyl 3,4-epoxycyclohexanecarboxylate;
as corresponding hardener between 2% by weight and 5% by weight of a polycarboxylic acid and/or a polycarboxylic anhydride;
as additive between 0% by weight and 1% by weight of a wetting agent;
where the nonvolatile constituents present add up to 100% by weight.

If the reactive composition is provided as a solution, at least 98% by weight of solvent should be evaporated out of the fibres, such that the prepreg has a residual solvent content of less than 1% by weight, based on the total weight of the prepreg. The prepreg is then very substantially dry and can be handled in a simple manner. Incidentally, the solvent acts as a plasticizer when the solvent content is higher, and so the glass transition temperature falls significantly. An elevated residual solvent content could thus lower the glass transition temperature to values below 30° C. A further advantage of a low residual solvent content is that barely any solvent escapes from the prepreg in the course of performance of the second crosslinking reaction and causes unwanted bubble formation or delamination.

A particularly preferred prepreg which is produced by the process according to the invention accordingly has a residual content of less than 1% by weight of solvent, based on the total weight of the prepreg.

Now that the chemistry of the polyurethane formulation used as the reactive composition in accordance with the invention has been extensively described the process engineering aspects of the invention shall be more particularly elucidated.

The way in which the fibres are provided depends on the fibres used and the form in which they are obtainable. The fibres themselves are made of the customary fibre materials such as glass, carbon, aramid. However it is also possible to employ fibres made of basalt, metal or organic materials from nature. The fibres may be in the form of short staple fibre or continuous filaments. The fibres are generally provided not in loose form but as a sheetlike and/or linear textile structure. The sheetlike textile structure comprises woven fabrics, scrims, knits, unidirectional fibre bundles or fibrous webs made of the relevant fibre material. Linear textile structures are rovings, yarns or braids. Sheetlike textile structures may in turn be constructed from the linear textile structure, for instance when a yarn is woven. There are no limits to the dimensions of the sheetlike textile structure; in particular tapes or ribbons may also be employed. The sheetlike textile structure is provided in individual cut-to-size formats but is preferably unwound from a roll as a continuous web.

If the reactive composition is used as a dry powder mixture, the step of coating the fibres with the composition is effected simply by scattering. The melting and incipient crosslinking (first crosslinking reaction) is effected by supply of heat, for instance by contact heating or heat radiation. The supply of heat triggers the addition polymerization between the hardener and the binder to a small extent. The reaction conversion is sufficiently low under the chosen process conditions as to result in merely an increase in the molecular weight but not yet in formation of a three-dimensional network. The result is therefore a thermoplastic which can be reversibly melted and cooled down again. Due to the heat, the thermoplastic is in the form of a low-viscosity melt and penetrates into the interspaces between the fibres. The fibres are thus embedded into the thermoplastic polymer. The powder route is therefore particularly environmentally friendly since no solvents need be used and removed.

If the reactive composition is to be processed in the liquid state, binder and hardener are provided in a solution in a solvent. The step of coating the fibres or the sheetlike textile structure is effected by impregnation thereof with the solution. Compared to the scattering of powder, this has the advantage that the reactive mixture will thus also penetrate deep into the sheetlike textile structure, thereby improving the adhesion of the mixture to the textile during the production and later of the fibre-matrix composite. A liquid composition is therefore preferred over the powder variant.

The impregnation of the fibres or of the sheetlike textile structure is accomplished by soaking, dipping or other processes suitable for processing. It is essential that the fibres are surrounded by the solution. This is achieved when the solution very substantially fills the interspaces between the fibres. It is conceivable in principle not to impregnate the entirety of the fibres, but merely individual fibre sections. Impregnation is preferably effected continuously in a roll-to-roll process.

The solvents specified above can be readily removed again from the sheetlike textile structure by evaporation after the impregnation. This requires only low temperatures on account of the high volatility of these solvents. These solvents additionally make it possible to achieve, after drying, negligible residual solvent contents below one per cent by weight, preferably below 0.5 per cent by weight.

The process step of evaporating the solvent and the performance of the first crosslinking reaction is preferably effected in one operation by heat treatment at a temperature of 80° C. to 170° C., preferably at a temperature of 120° C. to 160° C. and more preferably at a temperature of 140° C. to 160° C. The duration of heat treatment is one minute to 60 minutes, preferably ten minutes to 30 minutes. The exposure to heat is best effected in contactless fashion with infrared radiation or heat radiation. The heat may also be applied with a hot gas stream. The heat brings about the evaporation of the solvent and also the reaction of hardener and binder to afford the thermoplastic polymer. Since the fibres were impregnated with the solution, the fibres are deeply embedded in the thermoplastic formed. When the impregnated fibres are present on a roll, the evaporating of the solvent and the performance of the first crosslinking reaction is most rationally effected on this roll, for example in a continuous oven.

On completion of the first crosslinking reaction, the prepreg formed, i.e. the thermoplastic polymer having the fibres embedded therein, is finished. This is necessary in particular when the prepreg comes from a roll. Finishing involves first cutting the thermoplastic polymer into individual prepreg laminas and stacking the individual prepreg laminas. The number of laminas depends on the intended thickness of the later stiffening. It is also possible to use different prepreg materials in the individual layers. The prepared stacks are then cut to the required geometry in a cutting apparatus. The cutting-to-size is accomplished by standard techniques such as laser or waterjet cutting. The cutting-to-size is preferably carried out such that as much material as possible is utilized and scrap is reduced. The scrap thermoplastic polymer can incidentally be reused in the process by melting it off. The fibres exposed in the process can still be used at least partly as short sections.

Particular preference is thus given to the production of the prepreg in a roll-to-roll process in which the fibres are provided continuously from a roll as a sheetlike textile fabric, in that the sheetlike textile fabric is coated continuously with the reactive composition, and in that the sheetlike textile fabric coated with the reactive composition is exposed continuously to heat to perform the first crosslinking reaction, such that the thermoplastic polymer with the fibres embedded therein forms a continuous prepreg in the form of a strip which is cut into individual sections and the individual sections are layered in a stack and pressed to form a laminate.

When the prepreg is produced in accordance with the invention, it receives a temperature-dependent surface tack which can be controlled by heating or cooling during the processing thereof.

The term "surface tack" refers in the literature to the property of a material of bonding to other materials by virtue of surface bonding, i.e. adhesion. Substances are described as "tacky" when they stick to another workpiece with or without additional pressure. (G. Habenicht, "Kleben-Grundlagen, Technologie, Anwendungen" [Adhesive Bonding—Fundamentals, Technology, Applications], Springer Verlag Berlin, 2009, p. 199). Adhesion may arise either via mechanical mechanisms such as intermeshing or else via physical or chemical interactions, or a combination of the two phenomena. Adhesion to metals can be increased, for example, via polar interactions or hydrogen bonds. For an adhesive bond, not only tack but also adequate wetting of the adherend is required.

The surface tack of permanently tacky substances, called pressure-sensitive adhesives, can be determined by the "loop method" according to DIN EN 1719. Accordingly, surface tack is defined as the maximum force required to separate a loop of a material coated with pressure-sensitive adhesive at a fixed speed from a surface of defined size and surface characteristics with which it has been contacted beforehand. A measure employed for tack is thus the peeling force required.

A prepreg produced in accordance with the invention accordingly comprises a thermoplastic polymer based on polyurethane resulting from a reactive composition, the latter comprising at least the following constituents:
- at least one blocked hardener which is preferably an internally blocked uretdione having an NCO functionality of at least two,
- at least one binder which is a polyol compound having an OH functionality of 3 to 6 and which has at least one polar functional group selected from an ester, carbonate, amide, urethane, urea, thioester or thiocarbonate functionality;
- at least one co-binder which is an epoxy resin,
- at least one hardener which corresponds to the co-binder and is selected from the group comprising the following substance classes: aliphatic polyamines, cycloaliphatic polyamines, polyetheramines, polymercaptans or polyamidoamines, polycarboxylic acids, polycarboxylic anhydrides;

said prepreg further comprises fibres embedded in said thermoplastic polymer, and has a temperature-dependent surface tack having a value according to the loop method defined in DIN EN 1719 of less than 1 newton when the temperature of the prepreg is between 15° C. and 25° C.

This means that the prepreg produced in accordance with the invention is virtually non-tacky (peeling force below 1 N) in the cold state (15 to 25° C.). Such a prepreg likewise forms part of the subject-matter of the invention.

When the glass transition temperature is exceeded, the prepreg then becomes tacky. A prepreg that touches a reactive composition having a composition in accordance with the invention has a temperature-dependent surface tack having a value according to the loop method defined in DIN EN 1719 of between 5 newtons and 30 newtons when the temperature of the prepreg is between 50° C. and 100° C. At a higher temperature, the peeling force is higher, and the tack is accordingly greater.

A prepreg according to the invention is thus, as intended, stored, transported and handled in the cold state (15° C. to 25° C.) without unwanted sticking. Only on site is the prepreg heated to 50° C. to 100° C., in order to cause the desired tack.

The invention therefore also provides for the use of such a prepreg in the production of a hybrid component, in which the prepreg is first handled at a temperature between 15° C. and 25° C. and then pressed onto a metallic workpiece at a temperature of 50° C. to 100° C. without using an additional adhesive, such that the prepreg sticks to the workpiece.

Because of the good metal adhesion of the thermoplastic prepreg on the metal, it is possible to form the metal with the prepreg stuck to it to give the final shape before the prepreg is finally cured to give a thermoset. In a preferred use of the prepreg, therefore, the workpiece with the prepreg stuck to it is formed.

For example, the prepreg can be positioned on a steel or aluminium sheet, and the sheet together with the prepreg can be subjected to deep drawing. When the sheet has received its final shape, the second crosslinking reaction is conducted, which finally cures the thermoplastic polymer, and a hybrid component with a thermoset matrix is obtained.

In principle, the polyurethane composition described here has good adhesion to those metals that are typically used in the construction of components of a machine, of a land, air, space or water vehicle, of an apparatus, of an installation or of an appliance.

These are, for example, the galvanized or hot dip-galvanized steels used in automobile bodywork construction, including both cold- and hot-formed steels, and the aluminium alloys used in the automotive sector. Specific examples are DC 04, DC 06 or DP600 steels with ZE 100 or ZE 140 galvanization, 22MnB5 hot-formed steel, 6016 aluminium.

However, in one embodiment of the invention which should be given special mention, the metallic workpiece is composed of a steel having a microstructure which, in the course of performance of the second crosslinking reaction, undergoes a transformation and/or change. There is a change here particularly in the properties of the metallic material, for example strength or energy absorption. For example, it is possible to use heat-hardening steel materials composed of an expandable ferritic matrix with hard martensitic or bainitic phases incorporated therein.

The abovementioned metallurgical phase transformation is described in detail in "Structure and mechanical properties of dual phase steels", Ylva Granbom, Doctoral thesis 2010, Royal Institute of Technology School of Industrial Engineering and Management SE-100 44 Stockholm, Sweden.

Steels having a microstructure of this type which enable the usability of this metallurgical effect are known as dual-phase steels (DP) and, commercially, also as bake-hardening steels (BHZ). Preference is thus given, in the context of the process described here, to using a metallic workpiece made of a bake-hardening steel or of a dual-phase steel since the strength of these steels can be enhanced in the two heat treatment steps, just like that of the polyurethane composition crosslinkable in two stages.

In this connection, it should also be mentioned advantageously that the performance of the second crosslinking reaction in the course of which the thermoplastic polymer is converted to a thermoset polymer can be effected within a temperature range from 160° C. to 220° C. In exactly this temperature range, it is also possible to harden the above-described dual-phase steels/bake-hardening steels. The two material changes "phase transformation of the metal" and "full crosslinking of the matrix" can thus be performed in one common process step, thus saving time and energy.

Because of the close connections between the production of the prepreg, the properties of the prepreg thus produced and the processing thereof to give the hybrid component, a corresponding process for producing a hybrid component also forms part of the subject-matter of the invention. This preferably comprises the following steps:

a) providing a reactive composition comprising the following constituents:
- at least one blocked hardener which is preferably an internally blocked uretdione having an NCO functionality of at least two,
- at least one binder which is a polyol compound having an OH functionality of 3 to 6 and which has at least one polar functional group selected from an ester, carbonate, amide, urethane, urea, thioester or thiocarbonate functionality,
- at least one co-binder which is an epoxy resin,
- at least one hardener which corresponds to the co-binder and is selected from the group comprising the following substance classes: aliphatic polyamines, cycloaliphatic polyamines, polyetheramines, polymercaptans or polyamidoamines, polycarboxylic acids, polycarboxylic anhydrides;
- wherein a polyol compound or a mixture of a number of polyol compounds is used as binder, the OH number measured according to DIN 53 240-2 or mean OH number of which is above 300 mg KOH/g, and/or
- with choice of the proportion of corresponding hardener in the reactive composition at greater than 2% by weight, based on the total solids content of the reactive composition;

b) providing fibres;

c) coating the fibres with the reactive composition;

d) exposing at least the reactive composition to heat to perform a first crosslinking reaction, in the course of which hardener and binder are converted to a thermoplastic polymer having a glass transition temperature measured in the second heating curve at 10 K/min according to the DSC method as defined in DIN 53765 above 30° C., the fibres being embedded into the thermoplastic polymer;

e) obtaining a prepreg comprising a thermoplastic polymer with the fibres embedded therein, the prepreg having a temperature-dependent surface tack having a value according to the loop method defined in DIN EN 1719 of less than 1 newton when the temperature of the prepreg is between 15° C. and 25° C., and having a value according to the loop method defined in DIN EN 1719 of between 5 newtons and 30 newtons when the temperature of the prepreg is between 50° C. and 100° C.;

f) storing and/or transporting the prepreg over a period of one day up to one year at temperatures between 15° C. and 30° C. and then:

g) providing a metallic workpiece;

h) handling the prepreg at a temperature between 15° C. and 25° C.

i) pressing the prepreg at a temperature between 50° C. and 100° C. onto the metallic workpiece without use of an adhesive, such that the prepreg sticks to the workpiece;

k) optionally: forming the workpiece with the prepreg stuck to it;

l) exposing the prepreg stuck to the workpiece to heat to perform a second crosslinking reaction, in the course of which the thermoplastic polymer is converted to a thermoset polymer;

m) obtaining a hybrid component comprising the metallic workpiece with the thermoset polymer stuck to it, the latter enclosing the fibres embedded therein as matrix.

Finally, the process product, namely the hybrid component produced in this way, also forms part of the subject-matter of the invention.

Fields of use of industrial interest for such hybrid components are wherever low weights, high stiffnesses and low material costs are important. A particularly relevant field of use for the present hybrid components is therefore bodywork constituents of automobiles and other land vehicles, for instance B-pillars, crossmembers, longitudinal members or floorpans. Other possible hybrid components include panels therefor, which, in conventional sheet metal construction, are not among the load-bearing structural components, for instance bonnets or doors. Structural components of aeroplanes may also be executed as hybrid components in the manner described here.

EXAMPLES

The invention will now be explained in more detail by reference to examples.

In all of the experiments, the textile fabric used was a twill weave made from carbon fibres having a basis weight of 200 g/m$^2$ made from Torayca FT 300 3K 200tex fibres.

In the noninventive Example 1, the mixture chosen was a reactive polyurethane composition which comprises beside solvent exclusively an uretdione-containing hardener and a polyether polyol (OH-number 475 to 500 mg KOH/g according to DIN 53 240-2) as main constituents, however does not comprise any corresponding hardener. The epoxy resin amounting to 1.1% does not serve as a co-binder but rather acts catalytically. Hence, this composition is comparable with Example 2 of DE102011006163A1, as the latter also consists of an uretdione-containing hardener and a polyether polyol (OH-number 630 mg KOH/g according to DIN 53 240-2) only, beside additives and solvent.

Example 2 is likewise noninventive; this formulation leads to prepregs that are already tacky at room temperature (25° C.). The amount of corresponding hardener in this formulation is below 2% of weight.

Inventive Examples 3 and 4, by contrast, describe formulations having elevated glass transition temperature, which are not tacky until temperatures above 30° C. (room temperature+5° C.).

Formulations used within the examples are displayed in the following tables.

TABLE 1

Formulation of the polyurethane matrix for noninventive Example 1

| Name | Starting weight/ % by wt. | Producer/ supplier |
| --- | --- | --- |
| Uretdione-containing hardener Vestagon B11604 60% in acetone (NCO content of uretdione: 14%) | 72.9 | Evonik |
| Binder: polyether polyol Voranol RN 490 (OHN: 475-500 mg KOH/g) | 12.4 | DOW |
| Solvent Isopropyl acetate | 13.2 | Fluka |
| Catalyst VESTAGON SC5050 (tetraethylammonium benzoate) | 0.3 | Evonik |
| Catalyst component Epikote 828 | 1.1 | Momentive |
| Catalyst component oxalic acid | 0.1 | Aldrich |

TABLE 2

Formulation of the polyurethane matrix for noninventive Example 2

| Name | Starting weight/ % by wt. | Producer/ supplier |
| --- | --- | --- |
| Vestagon BF 1320, uretdione-containing hardener (NCO content: 14%) | 27.7 | Evonik |
| Binder: Capa 4101, tetrafunctional polyester (OHN: 224 mg KOH/g) | 21.2 | Perstorp |
| Epikote Resin 828, oxirane-containing co-binder | 6.9 | Momentive |
| Aradur 3380, polycarboxylic acid hardener | 1.1 | Huntsman Advanced Materials |
| Additive: TegoWet 500 | 0.3 | Evonik |
| Methyl isobutyl ketone | 21.4 | Fluka |
| Isopropyl acetate | 21.4 | Fluka |

TABLE 3

Formulation of the polyurethane matrix for Inventive Example 3

| Name | Starting weight/ % by wt. | Producer/ supplier |
| --- | --- | --- |
| Vestagon BF 1320, uretdione-containing hardener (NCO content: 14%) | 34.2 | Evonik |
| Binder: Capa 4101, tetrafunctional polyester (OHN: 224 mg KOH/g) | 18.8 | Perstorp |
| Epikote Resin 828, oxirane-containing co-binder | 6 | Momentive |
| Aradur 3380, polycarboxylic acid hardener | 5.8 | Huntsman Advanced Materials |
| TegoWet 500, additive | 0.4 | Evonik |
| Methyl isobutyl ketone | 17.4 | Fluka |
| Isopropyl acetate | 17.4 | Fluka |

TABLE 4

Formulation of the polyurethane matrix for Inventive Example 4

| Name | Starting weight/ % by wt. | Producer/ supplier |
| --- | --- | --- |
| Vestagon BF 1320, uretdione-containing hardener (NCO content: 14%) | 12.5 | Evonik |
| Vestagon B11604 60% in isopropyl acetate, uretdione-containing hardener (NCO content of the uretdione: 14%) | 33.1 | Evonik |
| Binder: Capa 4101, tetrafunctional polyester (OHN: 224 mg KOH/g) | 9.5 | Perstorp |
| Binder: Capa 3031, tetrafunctional polyester (OHN: 560 mg KOH/g) | 5.8 | Perstorp |
| Epikote Resin 828, oxirane-containing co-binder | 6.0 | Momentive |
| Aradur 3380, polycarboxylic acid hardener | 2.2 | Huntsman Advanced Materials |
| TegoWet 500, additive | 0.1 | Evonik |
| Methyl isobutyl ketone, solvent | 15.4 | Fluka |
| Isopropyl acetate, solvent | 15.4 | Fluka |

The feedstocks from the tables were each processed by means of a dissolver at temperatures of not more than 50° C. to give a homogeneous solution.

To coat the textile fabric with the polyurethane matrix, the carbon fibre fabric was impregnated with the solution and then dried in an oven at 150° C. for 10 minutes.

Subsequently, four laminas of the prepreg were each cut to a size of 20×20 cm² and stacked. The prepared stacks were pressed with a Vogt LaboPress P 400 S laboratory press at a temperature of 150° C. and a pressure of 3 bar for 3 minutes.

The laminates formed were subsequently placed onto steel sheets of dimensions 10×10 cm² of the DP600 type and pressed on with a rubber roller. For each of the four formulations specified, one steel sheet was used at room temperature and one after heating to 50° C. in an air circulation drying cabinet for 15 minutes. There was no pretreatment of the metal surfaces. To assess the adhesion, the bond, after cooling down fully to room temperature, was rotated by 360° about its own axis.

In the case of Example 1, the fibre composite material became detached from the metal surface on rotation, irrespective of whether the metal sheet had been preheated beforehand or had not been preheated. In the case of Example 2, good adhesion was observed to the non-preheated sheet. Adhesion to the preheated sheet was weak. The improved tack at room temperature can be attributed firstly to the fact that the proportion of liquid polyol was distinctly increased compared to Example 1. This results in a lower softening temperature and hence increased tack at room temperature. Moreover, the polyol in Example 1 is a polyether polyol; in Example 2, a polyester polyol is used. Because of the polar ester groups, the latter has higher adhesion to metal surfaces than polyether. A disadvantage of Example 2 is that the exposed side of the fibre composite material is also tacky at both temperatures. Therefore, when applying pressure by means of a rubber roller, it is necessary to work with PTFE release films, which means increased operational complexity.

Example 3, by comparison with Example 2, contains a distinctly increased amount of corresponding hardener of above 2% by weight. By virtue of the high glass transition temperature of the single constituent and the higher crosslinking during grouting the glass transition temperature according to DIN 53765 of the entire composition rises from below 20° C. to 63° C. In this way, it is possible to targetedly control the tack within the temperature range between 50° C. and 80° C. While at room temperature no tack was established, prepreg becomes slightly tacky at 50° C. shortly below glass transition temperature and strongly tacky at 80° C.

Example 4, by comparison with Example 2, contains a further polyol that has a distinctly increased OH number compared to the first polyol. Due to stoichiometry, more uretdione-containing hardener with high glass transition temperature is employed. As in Example 3, compared to Example 2, for this reason there is an increase in the glass transition temperature of the entire composition to greater than 30° C.

In both example formulations 3 and 4, detachment of the prepreg stack from the unheated sheet was observed. After preheating of the sheet, however, no detachment was observed on rotation. The tack and hence the adhesion can be controlled by the temperature of the metal surface in both formulations. The exposed side of the fibre composite material is not tacky, and so no PTFE film is required.

The hybrid sheets were subsequently cured in an oven at a temperature of 200° C. over 30 minutes without additional affixing. The adhesion to the metallic substrate was conserved in Examples 2, 3 and 4.

Loop Tack Test Based on DIN EN 1719:

For quantification of the tack, the adhesion was determined on the basis of the loop method DIN EN 1719.

Steel sheets of the DPP600 type with dimensions 10×10 cm² and prepreg strips from Examples 1, 2, 3 and 4 with dimensions 20×2.5 cm² were provided. The sheets were treated to 23° C., 50° C. and 80° C. with the aid of a heating device. The temperature precision was +/−0.5° C. The measurements were conducted at a room temperature of 22.5° C. and an air humidity of 55%.

The respective prepreg strip was pressed onto a surface of the adherend over an area of 25×25 mm² with a pressure of 1 bar/cm² (corresponding to 61 N/6.25 cm²) for 30 s. The two ends of the strip were fixed and the strip was pulled at either end at a 90° angle to the surface of the adherend at a speed of 5 mm/s. The maximum force in newtons that was required in each case to detach the prepreg strip from the metal surface was evaluated. For this purpose, the stable measurement range outside the start and end region was determined. Table 4 shows the maximum force as a function of temperature. These quantitative results confirm the observation from the experiments described that the tack in Inventive Examples 3 and 4 exists only at a temperature of 50° C. or higher, and not at room temperature. Example 2 does not show this temperature-dependent tack; Example 1 has weak tack at 80° C., only.

TABLE 4

Maximum force required in N to detach the prepreg strip from the metal surface by the loop method DIN EN 1719.

|  | 25° C. | 50° C. | 80° C. |
| --- | --- | --- | --- |
| Example 1 | not measurable | not measurable | 5.0 |
| Example 2 | 28.3 | 5.2 | not measured |
| Example 3 | not measurable | 8.1 | 15.8 |
| Example 4 | not measurable | 5.0 | 20.2 |

What is claimed is:

1. Process for producing a laminate, comprising the steps of:
   a) providing a reactive composition comprising at least the following constituents:
      at least one blocked isocyanate hardener,
      at least one binder which is a polyol compound having an OH functionality of 3 to 6 and which has at least one polar functional group selected from an ester, carbonate, amide, urethane, urea, thioester or thiocarbonate functionality;
      at least one co-binder which is an epoxy resin,
      at least one hardener which corresponds to the co-binder and is selected from the group comprising the following substance classes: aliphatic polyamines, cycloaliphatic polyamines, polyetheramines, polymercaptans or polyamidoamines, polycarboxylic acids, polycarboxylic anhydrides;
   b) providing fibres;
   c) coating the fibres with the reactive composition;
   d) exposing at least the reactive composition to heat to perform a first crosslinking reaction, in the course of which hardener and binder are converted to a thermoplastic polymer, the fibres being embedded into the thermoplastic polymer;

e) obtaining a prepreg comprising the thermoplastic polymer with the fibres embedded therein, characterized in that the reactive composition is provided in such a way that the glass transition temperature of the thermoplastic polymer measured in the second heating curve at 10 K/min according to the DSC method as defined in DIN 53765 is above 30° C., through i) use of a polyol compound or a mixture of a number of polyol compounds as binder, the OH number measured according to DIN 53 240-2 or mean OH number of which is above 300 mg KOH/g, and/or ii) choice of the proportion of hardener which corresponds to the co-binder in the reactive composition at greater than 2% by weight, based on the total solids content of the reactive composition, characterized in that the fibres are provided continuously from a roll as a textile fabric, in that the textile fabric is coated continuously with the reactive composition, and in that the textile fabric coated with the reactive composition is exposed continuously to heat to perform the first crosslinking reaction, such that the thermoplastic polymer with the fibres embedded therein forms a continuous prepreg in the form of a strip which is cut into individual sections and the individual sections are layered in a stack and pressed to form a laminate.

2. Process according to claim 1, characterized in that hardeners used are uretdiones which are free of blocking agents and are prepared from at least one of the following substances: isophorone diisocyanate (IPDI), hexamethylene diisocyanate (HDI), diisocyanatodicyclohexylmethane (H12MDI), 2-methylpentane diisocyanate (MPDI), mixtures of 2,2,4-trimethylhexamethylene diisocyanate and 2,4, 4-trimethylhexamethylene diisocyanate (TMDI), and norbornane diisocyanate (NBDI).

3. Process according to claim 1 characterized in that the binder used is at least one polyester polyol having an OH number measured according to DIN 53 240-2 between 20 mg KOH/g and 500 mg KOH/g and having an acid number measured according to DIN EN ISO 2114 of not more than 2 mg KOH/g.

4. Process according to claim 1, characterized in that the binder used is at least one polycaprolactone having an OH number measured according to DIN 53 240-2 between 20 mg KOH/g and 1000 mg KOH/g and having an acid number measured according to DIN EN ISO 2114 of not more than 2 mg KOH/g.

5. Process according to claim 1, characterized in that co-binders used are epoxy resins selected from the group comprising epoxy resins based on bisphenol A diglycidyl ether, epoxy resins based on bisphenol F diglycidyl ether and cycloaliphatic types.

6. Process according to claim 1, characterized in that the composition comprises, as further component, at least one additive, selected from the group consisting of a rheology modifier, a wetting agent, a colour pigment, a defoamer, a release agent, a filler, a deaerator, an impact modifier, a flow auxiliary, a levelling auxiliary, and a flame retardant.

7. Process according to claim 1, characterized in that the composition is provided as a dry powder, and so the coating of the fibres with the composition is effected by scattering and/or melting the powder onto the fibres.

8. Process according to claim 1, characterized in that the composition is provided in a liquid solvent, the constituents of the composition being dissolved and/or suspended and/or dispersed in the solvent, such that the fibres are coated with the composition by impregnating the fibres with the solvent and the constituents dissolved/suspended/dispersed therein, and in that the solvent is at least partly evaporated out of the fibres in the course of performance of the first crosslinking reaction.

9. Process according to claim 8, characterized in that the solvent is an ester or a ketone or a mixture comprising at least one ester and/or at least one ketone.

10. Process according to claim 8, characterized in that the solids content of the solution is between 30% by weight and 80% by weight, based on the total weight of the solution.

11. Process according to claim 1, characterized in that the nonvolatile constituents present in the reactive composition are between 30% by weight and 70% by weight of hardener
between 30% by weight and 70% by weight of binder
more than 0% by weight and up to 20% by weight of co-binder
more than 0% by weight and up to 20% by weight of corresponding hardener
between 0% by weight and 5% by weight of additives, where the nonvolatile constituents present add up to 100% by weight.

12. Process according to claim 11, characterized in that the reactive composition comprises as hardener 40% by weight to 60% by weight of a uretdione or a mixture of two or more uretdiones based on isophorone diisocyanate (IPDI);
as binder 25% by weight to 50% by weight of a polycaprolactone or a mixture of two or more polycaprolactones;
as co-binder 5% by weight to 15% by weight of an epoxy resin selected from the group comprising epoxy resins based on bisphenol A diglycidyl ether, epoxy resins based on bisphenol F diglycidyl ether and cycloaliphatic types;
as corresponding hardener between 2% by weight and 5% by weight of a polycarboxylic acid and/or a polycarboxylic anhydride;
as additive between 0% by weight and 1% by weight of a wetting agent; where the nonvolatile constituents present add up to 100% by weight.

13. Process according to claim 8, characterized in that at least 98% by weight of the solvent has evaporated out of the fibres.

14. A method of producing a hybrid component, comprising producing a laminate according to the process of claim 1, handling the laminate at a temperature between 15° C. and 25° C., and then pressing the laminate onto a metallic workpiece at a temperature of 50° C. to 100° C. without using an additional adhesive, such that the laminate sticks to the workpiece.

15. The method of claim 14, further comprising exposing the laminate that is stuck to the workpiece to heat within a temperature range from 160° C. to 220° C., in the course of which the thermoplastic polymer is converted to a thermoset polymer.

16. Process for producing a hybrid component, comprising the steps of:

a. providing a reactive composition comprising the following constituents:
  i. at least one blocked isocyanate hardener,
  ii. at least one binder which is a polyol compound having an OH functionality of 3 to 6 and which has at least one polar functional group selected from an ester, carbonate, amide, urethane, urea, thioester or thiocarbonate functionality,
iii. at least one co-binder which is an epoxy resin,
iv. at least one hardener which corresponds to the co-binder and is selected from the group comprising the following substance classes: aliphatic polyamines, cycloaliphatic polyamines, polyetheramines, polymercaptans or polyamidoamines, polycarboxylic acids, polycarboxylic anhydrides;

with use of a polyol compound or a mixture of a number of polyol compounds as binder, the OH number measured according to DIN 53 240-2 or mean OH number of which is above 300 mg KOH/g, and/or with choice of the proportion of hardener which corresponds to the co-binder in the reactive composition at greater than 2% by weight, based on the total solids content of the reactive composition;

b. providing fibres;
c. coating the fibres with the reactive composition;
d. exposing at least the reactive composition to heat to perform a first crosslinking reaction, in the course of which hardener and binder are converted to a thermoplastic polymer having a glass transition temperature measured in the second heating curve at 10 K/min according to the DSC method as defined in DIN 53765 above 30° C., the fibres being embedded into the thermoplastic polymer;
e. obtaining a prepreg comprising a thermoplastic polymer with the fibres embedded therein, a prepreg having a temperature-dependent surface tack having a value according to the loop method defined in DIN EN 1719 of less than 1 newton when the temperature of the prepreg is between 15° C. and 25° C., and having a value according to the loop method defined in DIN EN 1719 of between 5 newtons and 30 newtons when the temperature of the prepreg is between 50° C. and 100° C.;
f. storing and/or transporting the prepreg over a period of one day up to one year at temperatures between 15° C. and 30° C. and then:
g. providing a metallic workpiece;
h. handling the prepreg at a temperature between 15° C. and 25° C.
i. pressing the prepreg at a temperature between 50° C. and 100° C. onto the metallic workpiece without use of an adhesive, such that the prepreg sticks to the workpiece;
n) optionally: forming the workpiece with the prepreg stuck to it;
o) exposing the prepreg stuck to the workpiece to heat to perform a second crosslinking reaction, in the course of which the thermoplastic polymer is converted to a thermoset polymer;
p) obtaining a hybrid component comprising the metallic workpiece with the thermoset polymer stuck to it, the latter enclosing the fibres embedded therein as matrix.

\* \* \* \* \*